United States Patent
Burke, Jr. et al.

[15] 3,673,168
[45] June 27, 1972

[54] POLYMERIZATION PROCESS

[72] Inventors: Oliver W. Burke, Jr., 506 Intracoastal Drive, Fort Lauderdale, Fla. 33304; Joseph Austin A. Kizer, 211 S.E. Sixth Court, Pompano Beach, Fla. 33060; Pauls Davis, 30027 White St., Gibralter, Mich. 48173

[22] Filed: Jan. 22, 1970

[21] Appl. No.: 4,812

Related U.S. Application Data

[63] Continuation-in-part of Ser. No. 447,241, April 12, 1965, abandoned, and a continuation-in-part of Ser. No. 805,080, Jan. 29, 1969, abandoned, which is a continuation of Ser. No. 686,350, Nov. 28, 1967, abandoned, which is a continuation of Ser. No. 447,196, April 12, 1965, abandoned.

[52] U.S. Cl. .................................................260/94.2 R, 260/32.8 A;32.8 SB;33.4 PQ;82.1;83.5;83.7;85.3 R;85.5 XA;85.5 HC;85.5 ES;85.5 B;85.5 P;85.7;87.5 C;87.5 E;87.5 G;86.1 R;86.1 E;86.7;88.1 R;88.1 P;88.1 PN;88.1 PA;88.1 PE;88.2 E;88.2 B;88.2 B;88.2 C, 260/33.4 PQ, 260/47 UA, 260/63 BB, 260/67 UA, 260/67.6 R, 260/67.6 C, 260/78.5 B, 260/80 M, 260/82.1, 260/83.5, 260/83.7, 260/85.3 R, 260/85.5 P, 260/85.7, 260/86.1 R, 260/86.7, 260/87.5, 260/87.7, 260/88.1 R, 260/88.2 E, 260/88.3 L, 260/88.5, 260/88.7 G, 260/89.1, 260/89.3, 260/89.5 R, 260/91.1 R, 260/91.7, 260/92.8 R, 260/93.1, 260/93.5 R, 260/635 R, 260/95 R

[51] Int. Cl......................C08f 1/60, C08f 3/00, C08f 15/00

[58] Field of Search................260/32.8 A, 32.8 SB, 33.4 PQ, 260/82.1, 83.5, 83.7, 85.3 R, 85.5 XA, 85.5 HC, 85.5 ES, 85.5 B, 85.5 P, 85.7, 87.5 C, 87.5 E, 87.5 G, 86.1 R, 86.1 E, 86.7, 88.1 R, 88.1 P, 88.1 PN, 88.1 PA, 88.1 PE, 88.2 E, 88.2 B, 88.2 C; 260/87.7, 88.7 G, 89.1, 89.3, 91.1 R, 91.7, 88.3 L, 88.5, 92.8 R, 93.1, 93.5 R, 93.5 S, 94.2 R, 95 R, 635 H, 635 E, 78.5 B, 78.5 E, 89.5 R, 89.5 H, 89.5 A, 80 M, 63BB, 63HA

[56] References Cited

UNITED STATES PATENTS

| 1,586,803 | 6/1926 | Hermann et al.........................260/87 |
| 1,933,052 | 10/1933 | Fikentscher et al. .......................260/2 |
| 2,377,752 | 6/1945 | Britton et al...........................260/92.8 |
| 2,564,292 | 8/1951 | Wolf.......................................260/93.5 |
| 2,613,223 | 10/1952 | Young...................................260/635 |
| 2,757,210 | 7/1956 | Jenner...................................260/635 |
| 2,828,131 | 4/1958 | Greenspan et al....................260/94.2 |
| 2,850,540 | 9/1958 | Frank et al............................260/635 |
| 3,049,528 | 8/1962 | Diem...................................260/94.2 |

OTHER PUBLICATIONS

Synthetic Rubber, Whitby et al., John Wiley & Sons (1954)
Emulsion Polymerization, Bovey et al., Interscience (1955)

Primary Examiner—Joseph L. Schofer
Assistant Examiner—John Kight, III
Attorney—Hall & Houghton

[57] ABSTRACT

A process for forming polymer material having terminal hydroxyl groups and a number average molecular weight in the range of 500 to 10,000, by (A) forming a single phase polymerization system consisting essentially of hydrogen peroxide, specified vinylidene monomer and/or conjugated diene monomer, and liquid organic mutual solvent diluent comprising at least a major proportion of lower aliphatic saturated oxygenated solvent selected from the alcohols, ether alcohols, keto alcohols and ketones, which system is essentially free of materials that decompose hydrogen peroxide to form oxygen at below 100° C., and (B) heating said system to temperatures sufficiently above 100° C. to initiate and effect polymerization in said system.

20 Claims, 10 Drawing Figures

United States Patent

Burke, Jr. et al.

[15] 3,673,168

[45] June 27, 1972

POLYMERIZATION PROCESS

CROSS-REFERENCE TO RELATED APPLICATIONS

This application is a continuation-in-part of our applications Ser. No. 447,241, filed Apr. 12, 1965, and Ser. No. 805,080, filed Jan. 29, 1969; said application Ser. No. 805,080 having been a continuation of application Ser. No. 686,350, filed Nov. 28, 1967; the latter having been a continuation of application Ser. No. 447,196 filed concurrently with said application Ser. No. 447,241 on Apr. 12, 1965; and said concurrently filed applications having been continuations in part of our application Ser. No. 863,218, filed Dec. 31, 1959. The foregoing applications were abandoned in favor of the present application and application Ser. No. 101,111 (a further continuation of Ser. No. 447,241), and said application Ser. No. 101,111 is being abandoned in favor of the present application.

INTRODUCTION AND GENERAL OBJECTS

The invention herein disclosed relates to the production of low molecular weight polymers which have terminal hydroxyl groups, and aims generally to provide improved processes for such purpose.

A first object of the invention is to provide processes for producing such low molecular weight polymers with terminal hydroxyl groups from ethylenically unsaturated monomers.

A second object of the invention is to provide processes for producing such low molecular weight polymers with terminal hydroxyl groups from vinylidene monomers.

Other objects of the invention are to provide processes for producing such low molecular weight polymers with terminal hydroxyl groups from conjugated diene monomers with or without vinylidene monomers.

Other objects of the invention are to provide processes for producing polymers of these classes which have number average molecular weights in the range of from 500 to 10,000, and are substantially free of polymeric materials of higher molecular weight range.

Other objects are to provide processes for producing certain polymers of these classes which are water white and essentially free of cloudiness, color or haze.

Other objects are to provide processes for producing polymers of these classes which are essentially free of obnoxious odors.

Other objects are to provide processes for producing polymers of these classes which contain controlled oxygen content and hydroxyl functionality.

Still other objects are to provide processes for producing such polymers in a single phase polymerization employing hydrogen peroxide as polymerization catalyst under special conditions which contribute to the attaining of the foregoing objects.

Other and further objects and advantages of the invention will become apparent from the following description and examples of preferred embodiments thereof.

The invention resides in the novel features and combinations of the processes herein disclosed and is more particularly defined in the appended claims.

For ease of reference the present description is indexed by sub-heads and catch-lines which, however, are not to be regarded as limiting the invention in any way.

SPECIAL AIMS AND UTILITIES

In particular embodiments, the invention resides in a method for forming a polymer material having terminal hydroxyl groups and a number average molecular weight in the range of 500 to 10,000, which method comprises:

A. forming a single phase polymerization system of a combination of
   1. monomer material consisting essentially of one or more polymerizable ethylenically unsaturated monomers, preferably having not more than 14 carbon atoms, at least one of which has one or more substituents other than hydrogen, said monomer material consisting essentially of from 2 to 100 percent by weight of material having a water solubility at 20° C. of no more than 3.5 weight percent and from 0 to 98 percent by weight of material having a water solubility at 20° C. greater than 3.5 weight percent, said ethylenically unsaturated monomer materials excluding drying oil substances and excluding other non-conjugated polyene compounds,
   2. between 0.5–10 parts by weight of hydrogen peroxide per 100 parts of monomer, and
   3. a liquid organic mutual solvent-diluent for all the monomer material present and said hydrogen peroxide and any water present, said liquid organic mutual solvent-diluent comprising at least a major proportion of lower aliphatic saturated oxygenated solvent selected from the class consisting of the alcohols, ether-alcohols, keto-alcohols and ketones, preferably the water soluble alcohols, said system being essentially free of oxygen and of components that decompose hydrogen peroxide to form oxygen at less than 100° C., and B. heating said system at sufficient temperatures in the range of from above 100° C. to about 200° C. for a sufficient time to initiate and effect polymerization.

In one of the preferred embodiments of the just described method the monomer material of clause (A)(1) consists essentially of one or more polymerizable vinylidene monomers having at least one substituent other than hydrogen, said monomer material consisting essentially of from 2 to 100 percent by weight of material having a water solubility at 20° C. of no more than 3.5 weight percent and from 0 to 98 percent by weight of material having a water solubility at 20° C. greater than 3.5 weight percent.

In a further preferred embodiment of the above described method the monomer material of clause (A)(1) consists essentially of monomer material comprising by weight 2–100 percent conjugated diene monomer material and 0 to 98 percent vinylidene monomer material, said monomer material consisting essentially of from 2 to 100 percent by weight of material having a water solubility at 20° C. of no more than 3.5 weight percent and from 0 to 98 percent by weight of material having a water solubility of 20° C. greater than 3.5 weight percent.

By this process the invention (1) achieves polymerization to produce the desired polymers at adequate and controllable rates of polymerization while avoiding the disadvantages of organic peroxide and organic hydroperoxide catalyzed mass polymerizations, e.g. the presence of such organic catalyst residues in the product, and also the disadvantages of emulsion polymerizations, e.g. the presence of emulsifier in the product. It also (2) achieves the production of homopolymers and interpolymers of controlled number average molecular weights in the range of 500 to 10,000, preferably 1,000 to 3,000, from polymerizable monomer materials as aforesaid. In certain embodiments it also (3) achieves the production of homopolymers or interpolymers of conjugated diene monomers, or interpolymers of conjugated diene monomers and vinylidene monomers, the diene derived units of which are predominantly of 1,4-configuration, with the 1,4-configuration itself predominately of *trans* 1,4-configuration, with only a lesser proportion of 1,2-configuration. It also (4) provides polymers characterized by the fact that their groups, except for the polymerized monomer material therein, are essentially derived from the mutual solvent-diluent-hydrogen peroxide catalyst systems, e.g. from the $C_1$ to $C_4$ alkanolic hydrogen peroxide and/or $C_3$ to $C_5$ alkanonic hydrogen peroxide, and provide such low molecular weight polymers with hydroxyl groups; and (5) this invention achieves other new and useful improvements which will be apparent from the following general and detailed descriptions of illustrative embodiments of the invention.

The polymers prepared by the new process are useful as resin and/or binder components in protective and decorative coatings and for other purposes for which low molecular weight polymers of the class described are desired.

DRAWINGS

The accompanying drawings illustrate certain aspects of the invention. FIG. 1 to FIG. 9 hereof graphically illustrate the minimum amount by volume of the selected alkanolic and/or alkanonic mutual solvent-diluent required to form a single phase, i.e. a complete solution, for different volumes of 50 percent by weight and in some instances 90 percent by weight aqueous hydrogen peroxide, each in combination with 100 grams of the selected monomer material. By including the values for water in the figures for any concentration of aqueous hydrogen peroxide the amount of alkanolic and/or alkanonic mutual solvent-diluent to form a single phase can easily be determined. Similar graphs can easily be prepared for any of the monomer materials, aqueous hydrogen peroxide concentrations and alkanolic and/or alkanonic mutual solvent-diluent systems described herein. The figures are concerned with the following single phase systems including:

FIG. 10 is an infrared spectrum (significant portion) of the polybutadiene of Example 67, Table XII

GENERAL DESCRIPTION

In general, the present invention resides in the polymerization of (A) monomer material at least 2 percent of which is monomer material substantially insoluble to water, by the formation of a homogeneous system including (B) aqueous or anhydrous hydrogen peroxide and (C) liquid organic mutual solvent-diluent for the said hydrogen peroxide and the monomer (A) and any water present, which mutual solvent-diluent comprises at least a major proportion of lower aliphatic saturated oxygenated solvent selected from the alcohols, ether-alcohols, keto-alcohols and ketones and which renders the combination of (B) and (C) homogeneously soluble in the monomer (A) in a proportion appropriate to promote adequately rapid but controllable polymerization of the monomer material in said solution, and heating the same at elevated temperatures of above 100° C. to about 200° C. to form polymers which lie in the range of from about 500 to about 10,000 number average molecular weight and preferably about 1,000 to about 3,000 number average molecular weight; so that the controlled molecular weight polymers as produced have groups which, except for the polymerized monomer material therein, are oxygen containing groups essentially derived from the solution of said hydrogen peroxide in the said liquid organic mutual solvent.

The most suitable individual and combined mutual solvent-diluents for the hydrogen peroxide and the monomer material are those which form homogeneous solutions in all proportions, both with aqueous and anhydrous hydrogen peroxide and with the monomer material concerned, and these include the alcohols, ketones, alcohol-ketones, and alcohol-ethers, which are miscible in water in all proportions. Of these materials the alcohols, alcohol-ketones, and alcohol-ethers contain alcoholic hydroxyl groups, i.e. carbinol groups.

Also employable as solvent-diluents are (1) those of said liquid organic mutual solvent-diluents which are miscible with water only in limited proportions, but sufficiently so to produce a single phase of the ingredients; (2) those of said liquid organic mutual solvent-diluents which are miscible with water in at least such limited proportions in combination with essentially non-water miscible diluent in such proportions as to render the combination a mutual solvent-diluent; and (3) azeotropic mixtures of the foregoing which are advantageous for recovery purposes.

In a first embodiment of the invention, polymers in the above indicated molecular weight range of 500–10,000, are produced from vinylidene monomer material, e.g., styrene, in which aqueous hydrogen peroxide is virtually insoluble. If the monomer material is merely mixed with aqueous hydrogen peroxide then two phases result and only a very small amount of solid polymer is produced at the interface between them. However, when in accordance with the present invention, there is combined, with an appropriate amount of hydrogen peroxide, an appropriate proportion of such liquid organic mutual solvent-diluent, then this combination when added to the styrene forms a clear homogeneous solution therewith, and at elevated temperatures, i.e. above 100° C., polymerization is initiated which can be controlled to maintain the polymerization temperature, e.g. at 115° C. to obtain in say 3 to 4 hours a conversion of from about 40 percent to about 60 percent of the monomer to polymer. The product, when freed of unreacted and residual materials, is a clear water-white polymer, e.g. polystyrene. Thus, this embodiment of the invention provides homopolymers of vinylidene monomers which contain groups derived from the mutual solvent solution of hydrogen peroxide (the term vinylidene monomers as used herein excludes conjugated diene monomers, drying oil substances, and other non-conjugated polyene materials). In this first embodiment, similarly characterized interpolymer of such ingredient monomers may be produced, e.g. vinyl chloride/vinyl acetate interpolymers, styrene/acrylonitrile interpolymers, and interpolymers with dyeable groups. In this first embodiment of the invention there may be employed as the liquid organic mutual solvent-diluent an azetropic mixture of a mutual solvent-diluent and a solvent for either the monomer material or the hydrogen peroxide thus facilitating separation and recovery of the mutual solvent-diluent from the polymer.

In a second embodiment of the invention, polymers in the molecular weight range of 500 to 10,000 are produced from ethylenically unsaturated monomer material which contains a significant proportion, e.g. from 2 to 100 percent, of conjugated diene monomer material, e.g., butadiene-1,3, in which hydrogen peroxide is virtually insoluble. If the monomer material is merely mixed with aqueous hydrogen peroxide then two phases result and when heated 2 hours at 120° C. only a very small amount of solid polymer is produced at the interface between them. However, when, in accordance with the present invention, there is combined, with an appropriate amount of hydrogen peroxide, an appropriate proportion of the liquid organic mutual solvent-diluent, then this combination when added to the monomer material comprising conjugated diene monomer, forms a clear homogenous solution therewith, and at elevated temperatures, e.g. some several degrees above 100° C. polymerization is initiated which can be controlled to maintain the polymerization at desired temperatures within the range of above 100° to 200° C., to obtain, in e.g. 3 to 4 hours, a conversion of from about 40 percent to about 60 percent of the monomer to polymer. The product thus produced from butadiene-1,3, when freed of unreacted and residual materials, is a clear water-white viscous liquid polymer, predominately of 1,4-configuration, which contains groups derived from the mutual solvent solution of hydrogen peroxide. Following the same practice with other conjugated diene monomer combinations, produces homopolymers and interpolymers respectively of similar characteristics and hydroxyl functionality. In this second embodiment of this invention, interpolymers especially in the above indicated molecular weight ranges may be produced from conjugated diene monomers and vinylidene monomers. When the vinylidene monomer is in minor proportion, such as about 2 percent by weight of the monomers charged, brilliantly clear water-white viscous liquid polymers are produced, e.g., when employing butadiene-1,3 with about 2 percent as comonomer of vinyl acetate, or of methyl methacrylate, or of methyl acrylate. In this second embodiment of this invention, liquid interpolymers may be produced from conjugated diene monomers and aromatic hydrocarbon vinyl monomers e.g. butadiene-1,3 and styrene or the vinyl toluenes. Especially when the aromatic hydrocarbon vinyl monomer is charged in less amount, after the polymerization of the hydrocarbon conjugated diene monomer has been initiated, interpolymers are obtained which are clear, water-white, viscous liquids. In this second embodiment, interpolymers of conjugated diene monomers with polar vinylidene monomers may be produced, e.g., with vinyl chloride, vinyl acetate, acrylonitrile and monomers producing interpolymers with dyeable groups. In this second embodiment of the invention there may be employed as the liquid-organic mutual solvent-diluent an azeotropic mixture of a mutual solvent-diluent and a solvent for either the monomer material or the hydrogen peroxide thus facilitating separation and recovery of the mutual solvent-diluent from the polymer.

DEFINITIONS

As used herein, the term "interpolymers" comprises the products produced by batch, continuous or intermittent polymerization in which a single monomer is polymerized in the presence of another polymer material or in which two or more monomers in the absence or presence of other polymer material are at least in part simultaneously, intermittently, or sequentially charged and simultaneously, intermittently, or sequentially polymerized; or in which the interpolymer is formed by a combination of these modes of polymerization; and when the components of an interpolymer are inseparable from one another, because chemically bonded to one another, then the polymer may be referred to to as a copolymer, block polymer or graft polymer as the case may be.

As used herein, the term "ethylenically unsaturated monomer" denotes a monomer preferably of not more than 14 carbon atoms and containing and polymerizable through at least one group with the aid of hydrogen peroxide, includes vinylidene monomers, includes conjugated diene monomers having the group (but not the non-conjugated diene monomers), and excludes drying oil substances as hereinafter defined, and excludes other non-conjugated polyene compounds. The term "vinylidene monomer" denotes an ethylenically unsaturated monomer containing but one group and includes "vinyl" monomers having but one CH₂ = CH— group. The term "drying oil substances" connotes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or non-conjugated drying oils and whether bodied by heat and/or catalytically, (3) the fatty acids including their dimers, trimers and tetramers derived from such drying or modified drying oils. And the term "polyene" as used herein denotes compounds containing two or more groups.

The monomers concerned include several categories of monomers, herein differentiated by their relative solubility to water. Since the solvent or solute relationships of hydrogen peroxide and aqueous hydrogen peroxide are relatively similar to those of water, the readily available water values afford a reasonable basis for classification.

As used here the term "monomers virtually insoluble to water" denotes ethylenically unsaturated monomers which at 20° C. do not dissolve more than 1.0 gram of water per 100 grams of monomer and comprises two classes of monomers: (a) the hydrocarbon monomers virtually insoluble to water and (b) the polar monomers virtually insoluble to water.

The "hydrocarbon monomers virtually insoluble to water" include hydrocarbon monomers generally, and comprise, but are not limited to, the typical examples set forth in Table A.

TABLE A

Hydrocarbon Monomers Virtually Insoluble to Water

| Monomer | Solubility of Water in Monomer (1) |
|---|---|
| | (% by weight at 20° C.) |
| Hydrocarbon Conjugated Diene Monomers, e.g. | |
| Butadiene-1,3 | 0.06 |
| Isoprene | <0.1 |
| Piperylene | <0.1 |
| Hydrocarbon Vinylidene Monomers, e.g. | |
| Styrene | 0.6 |
| α-methylstyrene | 0.8 |

(1) as reported in literature

The "polar monomers virtually insoluble to water" which include, but are not limited to, the typical examples set forth in Table B, are separately classified because, in addition to carbon and hydrogen, these monomers contain other constituent material selected from the group consisting of oxygen, nitrogen, the halogens, silicon and in some instances sulfur and phosphorous atoms, and combinations of the foregoing.

TABLE B

Polar Monomters Virtually Insoluble to Water

| Monomer | Solubility of Water in Monomer (1) |
|---|---|
| | (% by weight at 20° C.) |
| Vinyl chloride | 0.11 (2) |
| Vinylidene chloride | 0.55 (2) |
| Vinyl acetate | 1.0 |
| Vinylidene fluoride | <0.5 |
| Vinyl propionate | 0.60 |
| Vinyl butyrate | 0.3 |
| Vinyl 2-ethylhexoate | 0.2 |
| n-butyl acrylate | 0.7 |
| 2-ethylhexyl acrylate | 0.14 |
| Vinyl methyl ether | 0.38 |
| Vinyl ethyl ether | 0.2 |
| Vinyl butyl ether | 0.09 |
| Vinyl isobutyl ether | 0.08 |
| 2-chlorobutadiene-1,3 | <1.0 |

(1) as reported in literature
(2) wt. % solubility in water at 25° C.

As used herein the term "monomers substantially insoluble to water" connotes those polar monomers containing carbon, hydrogen, and other constituent material which at 20° C. dissolve over 1.0 grams of water per 100 grams of monomer, but not over 3.5 grams of water per 100 grams of monomer. Such monomers include, but are not limited to the typical examples set forth in Table C.

TABLE C

Monomers Substantially Insoluble to Water

Solubility of Water in

| Monomers | Monomers (1) |
|---|---|
| | (% by weight at 20° C.) |
| Methacrolein | 1.7 |
| Acrylonitrile | 3.2 |
| Methyl methacrylate | 1.15 |
| Ethyl acrylate | 1.51 |
| Methyl acrylate | 2.32 |
| Methyl isopropenyl ketone | 3.0 |
| Isopropenyl acetate | 1.21 |

(1) as reported in literature

As herein used, the term "monomers essentially insoluble to water" connotes collectively the monomers which are either virtually insoluble to water or substantially insoluble to water as above defined.

The term "monomers soluble to water" as herein used, denotes the polar monomers which are soluble to water to an extent greater than the monomers essentially insoluble to water. Such monomers include, but are not restricted to, the typical examples set forth in Table D.

TABLE D

Polar Monomers Soluble to Water

Solubility (1)

| Monomers | (g. monomer/100 g. water) |
|---|---|
| Acrylamide | 204 |
| Acrolein | 20.8 |

(1) as reported in literature.

The term "hydrogen peroxide" as used herein includes aqueous hydrogen peroxide and comprises several distinct categories or ranges of the latter having different characteristics and utilities as set forth in Table E. For the purposes of this invention categories (b), (c)(1) and (c)(2) in this table constitutes the preferred range, while categories (c)(1) and (c)(2) constitute the more preferred non-hazardous range, and category (c)(1) constitutes the most preferred range.

The hydrogen peroxide employed may be produced by any of the known processes and may contain small amounts of organic or inorganic impurities provided such are not deleterious to the stability of the hydrogen peroxide. The mutual solvent-diluent and hydrogen peroxide when produced by contacting an isoalcohol e.g. isopropanol with oxygen or air does contain an appreciable quantity of ketone, e.g. acetone, which combination has been found effective among the catalyst-mutual solvent systems of this invention.

The term "terminal groups" as used herein refers to the groups derived from the alkanolic and/or alkanonic hydrogen peroxide, which initiate and/or terminate the polymer molecules and thus provide them with terminal hydroxyl groups.

been used in preparing the examples hereinafter set forth with such modifications as are set forth therein, are as follows:

COMBINING ESSENTIAL INGREDIENTS

The essential ingredients employed in the polymerization recipe are the monomer material, the hydrogen peroxide, and the mutual solvent-diluent therefor. As will be appreciated from Table E above, the process of this invention should be carried out so as to avoid having hydrogen peroxide and organic material combined in detonable proportions at any time. Accordingly, when hydrogen peroxide is employed in the range of category (a), above 80 to over 99 percent hydrogen peroxide, such hydrogen peroxide should be added to approximately 2 to 3 volumes or more of the mutual solvent-diluent, to prepare a safe solution to combine with the monomer; or be prepared in situ by air oxidation of a secondary alcohol; or be combined in more dilute aqueous solution followed by removal of the water. The amount of mutual solvent-diluent so used must be sufficient to insure that when the resulting solution is combined with the monomer material, the combination will form a homogeneous solution or single phase.

Likewise, in using aqueous hydrogen peroxide of category (b) Table E, while this category is less hazardous, similar precautions are preferably employed. When the aqueous hydrogen peroxide falls in categories (c)(1) and (c)(2) constituting the preferred range, Table E, it is immaterial in what order the essential ingredients are combined, except that a homogenous solution or single phase should be obtained prior to the initiation of polymerization. This same comment applies to the more dilute substantially ineffective ranges, categories (d)(1) and (d)(2), in which the presence of excessive water and consequential presence of excessive mutual solvent-diluent unduly retards the polymerization and overburdens the polymer recovery operation.

For the most part in the examples, 50 percent by weight aqueous hydrogen peroxide from category (c)(1), Table E, has been employed as affording the best over all balance of conditions for safe polymerization at elevated temperatures and at adequate polymerization rates, with adequate heat transfer for controlling the temperatures of polymerization, and for facilitating handling of the reaction products and the economical recovery of the polymer therefrom. While the minimum requirement of mutual solvent-diluent for bringing into single phase the hydrogen peroxide and monomer material to be used can be readily determined merely by combining proportionate parts of the hydrogen peroxide phase and monomer phase and measuring the quantity of mutual solvent-diluent required to be added to convert the two phases to a single phase; for purposes of facilitating control it is preferred to employ a volume of mutual solvent-diluent at least equal to the volume of aqueous hydrogen peroxide, and to in any event

TABLE E CATEGORIES OF HYDROGEN PEROXIDE

| Category | $H_2O_2$ range (wt. percent) | Wt. percent $H_2O_2$ | Wt. percent $H_2O$ | Moles $H_2O$ | Characteristics | Utilities |
|---|---|---|---|---|---|---|
| (a) | >99 to 80 | ≅100, >80 | ≅0, <20 | ≅1.0:0.0, 1.0:<0.5 | Possibly explosive range. | (a) Hazardous in presence of organic material when cl. |
| (b) | 80 to 54.2 | 80, >54.2 | 20, <45.8 | 1.0:0.5, 1.0:<1.5 | | (b) Hazardous in presence of organic material where at about stoichiometric proportions. |
| (c)(1) | 54.2 to 48.5 | 54.2, 48.5 | 45.8, 51.5 | 1.0:1.5, 1:2 | Non hazardous Preferred range. | (c)(1) non-hazardous and highly effective. |
| (c)(2) | <48.5 to 33.1 | <48.5, 33.1 | >51.5, 66.9 | 1:>2, 1:4 | | (c)(2) non-hazardous and less effective. |
| (d)(1) | <33.1 to 15.9 | <33.1, 15.9 | >66.9, 84.1 | 1:>4, 1:10 | Substantially ineffective range. | (d)(1) not practically effective. |
| (d)(2) | <15.9 to 6.0 | <15.9, 6.0 | >84.1, 94.0 | 1:>10, 1:30 | | (d)(2) virtually ineffective. |

GENERAL PROCEDURE

The preferred procedures employed for effecting the polymerizations according to this invention, and which have been used in preparing the examples hereinafter set forth with employ at least 5 ml of mutual solvent-diluent for each 100 grams of monomer to be charged.

The proportions of the hydrogen peroxide to be used should be in the range of 0.5 to 10 grams, preferably 1.0 to 5 grams, and most preferably 2.0 to 4 grams, based on hydrogen peroxide content, per 100 grams of monomer material charged.

The monomers to be polymerized, more particularly described hereinbefore and hereinafter, can be charged free of stabilizers and/or antioxidants. In the examples of preparation of polybutadiene according to this invention, the monomers are distilled and hence freed of antioxidants. In examples employing isoprene and/or piperylene and/or vinylidene monomers, however, the monomers used in the examples were not freed of antioxidants. Thus the invention may be practiced either in the presence or the absence of antioxidants.

OXYGEN EXCLUSION

In the polymerization of vinylidene monomers or of conjugated dienes with or without vinylidene monomers, the presence of oxygen is to be avoided, as this may lead to gelling of polymer and fouling of the reactor.

Another source of oxygen which it may be desirable to reduce or control is that afforded by the catalytic decomposition of hydrogen peroxide per se.

To minimize such decomposition in constructing the reactor system for use in the present process, only materials which do not appreciably decompose hydrogen peroxide should be used, such as the types of glass, ceramic ware, tin, aluminum or stainless steel (e.g. "300 type" stainless steel) suitable for storage of hydrogen peroxide. Thus the inner surface of the reaction vessel is preferably constructed of or lined with aluminum or aluminum alloy (i.e. of negligible copper content), tin, stainless steel, glass, enamel, porcelain or like predominantly silicious material or coated with a resin or other material in contact with which hydrogen peroxide is relatively stable. The inner surface of the reactor, when composed of glass or like silicious material, may be treated with a suitable compound of boron, such as boric acid, or the inner surface may be enameled. Where the reaction vessel is constructed of or lined with stainless steel, or aluminum, it is desirable to passivate the equipment by known methods, e.g., new equipment of stainless steel may be and preferably is thoroughly cleaned and then passivated by treatment with a strong volatile oxidizing agent, preferably hot 15 to 50 percent by weight nitric acid and hot 30 to 60 percent aqueous hydrogen peroxide in succession.

HYDROGEN PEROXIDE STABILIZERS

To further inhibit the decomposition of hydrogen peroxide during the polymerization reaction there may be included in the recipes hereof in minor amounts one or more hydrogen peroxide stabilizers.

From the foregoing, it will be appreciated that the present invention, in its broader aspects, may be practiced with or without hydrogen peroxide stabilizers.

REACTORS AND ADDITION OF MATERIALS THERETO

The reactor may be a tubular reactor, or a vessel type reactor with or without agitation and the polymerization may be carried out batchwise, continuously or intermittently.

The hydrogen peroxide may be added at the beginning of the reaction. The monomer material may be added before, concurrently with or after the other ingredients as above indicated, or even a part of the monomer material may be added after the polymerization has commenced.

MONOMER MATERIAL

The monomer materials employable in the practice of the invention in its several embodiments comprising essentially ethylenically unsaturated monomers containing one or more groups polymerizable with the aid of hydrogen peroxide and such monomers in addition to those mentioned heretofor and in the examples are selected from the following classes of monomers of which the examples set forth are illustrative: hydrocarbon conjugated dienes such as butadiene-1,3, isoprene, 2,3-dimethylbutadiene-1,3, piperylene, hexadiene-1,3, 2-phenyl-butadiene-1,3, and the like; the polar conjugated dienes such as 1- and 2-cyano-butadiene-1,3, 2-chlorobutadiene-1,3 and the like (it is to be noted that the term conjugated dienes includes hydrocarbon conjugated dienes and polar conjugated dienes); the $\alpha$-olefin monomers; vinyl, vinylidene and allyl aromatic monomers such as styrene, the vinyl toluenes, the methyl styrenes, the ethyl styrenes, the propyl styrenes, the vinyl biphenyls, the vinyl biphenyl ethers, the vinyl naphthalenes, the $\alpha$ and/or $\beta$ substituted vinyl aromatics such as $\alpha$-methyl styrene, isopropenyl biphenyl, isopropenyl biphenyl oxide and the like; the substituted vinyl, allyl or vinylidene aromatics including the alkyl, phenyl, alkoxy, phenoxy, acetyl, acylamino, isocyanate, carbamide, amido, nitrile, carboxyamido, trifluoromethyl, phosphoro, and halo (F, Cl, Br) substituents including the mono, di, tri, and tetra chloro styrenes, the fluorostyrenes, the chlorovinyl toluenes, the fluorovinyl toluenes, the cyano styrenes and the like monomers; esters of mono-olefinic acids with saturated alcohols including $\alpha$ and $\beta$ substituted mono-olefinic acids and including alkyl, aryl, aralkyl esters such as the methyl, ethyl, propyl, butyl, isobutyl, pentyl, hexyl, cyclohexyl, phenyl esters of acrylic, methacrylic, ethacrylic, and the like; and including the $\alpha$-halo-acrylates such as methyl $\alpha$-chloroacrylate, propyl $\alpha$-chloroacrylate and the like; the esters of mono-olefinic alcohols with saturated acids, such allyl, methallyl, crotyl, 1-chloroallyl, 2-chloroallyl, cinnamyl, vinyl, methylvinyl, 1-phenylally, butenyl and the like esters of saturated aliphatic and aromatic monobasic acids as vinyl and allyl acetate, isopropenyl acetate, vinyl formate, vinyl-2-ethyl hexoate, methyl vinyl acetate, vinyl and allyl propionate or n-butyrate and isopropenyl propionate, isopropenyl butyrate, vinyl and allyl benzoate, and the like; the dialkyl esters of mono-olefinic dicarboxylic acids such as the dialkyl esters and mixed dialkyl esters from such alkyls as methyl, ethyl, propyl, and the like through $C_5$, of the mono-olefinic dicarboxylic acids including maleic, citraconic, itaconic, muconic, glutaconic, fumaric and derivatives of these esters such as diethyl chloromaleate and the like; mono-olefinic acid esters of epoxy alcohols, such as 2,3-epoxypropyl methacrylate or acrylate, glycidyl methacrylate, glycidyl acrylate, glycidyl crotonate, 2,3-epoxybutyl acrylate, and the like; mono-olefinic acid esters of fluoro alcohols such as the $\alpha$-trifluoromethyl acrylic acid esters such as the methyl or ethyl ester or the ester of perfluoroethanol or the partially fluorinated alcohols, that is the fluoroalkanols such as octafluoropentanol and the like; the mono-olefinic halides, such as vinyl fluoride, vinyl chloride, vinyl bromide, vinylidene fluoride, vinylidene chloride, allyl fluoride, allyl chloride, $\alpha$-methallyl fluoride, $\alpha$-methallyl chloride, $\alpha$-ethallyl fluoride or chloride or bromide, tetrafluoroethylene, trifluorochloroethylene, dichloridifluoroethylene, trichlorofluoroethylene, perfluoropropylene, 1-phenyl-1,2 difluoroethylene, trichloroethylene and the like; the monoalkenyl ketones such as methyl vinyl ketone, isopropenyl methyl ketone, allyl methyl ketone, mesityl oxide, allyl phenyl ketone and the like; the mono-olefinic ethers such as vinyl ethyl ether, vinyl butyl ether, vinyl cyclohexyl ether, vinyl phenyl ether, vinyl tolyl ether, vinyl benzyl ether, methyl isopropenyl ether, allyl ethyl ether, methallyl ethyl ether, chloroallyl ethyl ether and the like; the mono-olefinic aldehydes such as acrolein, methacrolein, crotonaldehyde and the like; the mono-olefinic triazine monomers including triazine monomers in which one of the carbons of the triazine ring is attached to a vinyl, allyl, methallyl, crotyl, 1-chloroallyl, 2-chlorallyl, cinnamyl, butenyl radical or the like and the other carbons of the triazine are attached to cyano, halo (F, Cl, Br), alkoxy, cycloaliphatic (e.g. cyclopentyl, cyclohexyl, etc.), aromatic-substituent (e.g. phenyl, biphenyl, naphthyl, etc.), alkylaryl e.g., tolyl, xylyl, ethylphenyl, etc.) halogenated aromatic and the like; the N-vinyl and allyl guanidines including allyl melamine, allyl isomelamine and the like; the N-vinyl-N-alkylguanidines such as N-vinyl-N-n-butylguanidine, N-vinyl-N-benzyl guanidine, acryloguanidine, methacryloguanidine and the like; the n-vinyl monomers such as N-vinylpyrrole, N-vinyl carbazole, N-vinyl-indole, N-vinyl succinimide and the like; N-vinyl lactams such as N-vinyl caprolactam, N-vinyl butyralactam and the like; the amides and substituted amides of acrylic acid and $\alpha$ and $\beta$-substituted acrylic acids such as acrylamide, methacrylamide, ethacrylamide, N-methacrylamide, N-methylmethacrylamide or ethacrylamide, N,N-bis (hydroxyethyl) acrylamide, N,N-diethylacrylamide, N,N-ethylmethylacrylamide and other mono- and di-N substituted unsaturated acid amides where the substituent is $C_1$ to $C_5$ alkyl, alkoxy, haloalkyl and the like; the mono-olefinic nitriles such as acrylonitrile, methacrylonitrile, ethacrylonitrile, chloroacrylonitrile and the like; the fluoro-substituted nitriles of mono-olefinic acids such as N-(2,2,3-trifluoro-ethyl) acrylamide or methacrylamide, N-(2,2-difluoroethyl) acrylamide or methacrylamide; the mono-vinyl pyridines such as 2-vinylpyridine, 3-vinylpyridine, 4-vinylpyridine, 2-vinyl-5-ethylpyridine, 2-methyl-5-vinylpyridine and the other ethyl and methyl isomers of vinylpyridine and the like; the vinyl heterocyclic compounds such as 2-vinyl-furan and 2-vinylthiophene and the like; the silicon containing mono-olefinic monomers such as vinyltrichlorosilane and its hydrolysis products, the vinyl and allyl silicates and the like; the phosphorus containing monomers such as acrylic esters containing phosphonamido groups such as diamidophosphoroacrylate and the like and other similar polymerizable materials having a polymerizable unsaturated carbon-to-carbon bond.

MUTUAL SOLVENT-DILUENTS

The term mutual solvent-diluents connotes the solvents for hydrogen peroxide and the selected monomer material and any water present, and these mutual solvent-diluents are for the most part water miscible liquid organic solvents also miscible with the monomer material and preferably easily separable from the polymer. Most suitable are the liquid mutual solvent-diluents selected from the water miscible alcohols, ether-alcohols, keto-alcohols and ketones. Therefor, the $C_1$ to $C_4$ alcohols (i.e. alkanolic solvents) are especially suitable and include: methanol, ethanol, n-propanol, isopropanol, n-butanol, isobutanol, sec-butanol, tert-butanol. The ketones (i.e. alkanonic solvents) which may be used include: acetone, methyl ethyl ketone, and the like, the $C_3$ to $C_4$ ketones being preferred. The ketone alcohols including diacetone alcohol may be used; also the ether-alcohols including 2-methoxyethanol, 2-(ethoxyethoxy)ethanol and the like. Furthermore these mutual solvents may be used in combinations with each other and with other diluents as set forth heretofor especially in azeotropic mixtures, preferably those in which the mutual solvent-diluent predominates, e.g., methanol/2-butanone 70/30, methanol-1,2-dimethoxyethylene 90/10, methanol/toluene 69/31, ethanol/1,1-dichloropropane 53/47, ethanol/perchloroethylene 61/19, ethanol/toluene 68/32, isopropanol/tetrachloroethylene 80/29, isopropanol/toluene 69/31, n-propanol/toluene 52.5/47.5, and the like. Also there may be employed aqueous azeotropes of the mutual solvent-diluent and such azeotropes may be economically recovered and recycled. Thus it can be seen that the mutual solvent-diluent preferably should comprise at least a major proportion of lower aliphatic saturated oxygenated solvent.

CONDITIONS

As above indicated the reactions hereof are conducted in liquid phase at elevated temperatures sufficiently above 100° C., to initiate and maintain polymerization and preferably above 110° C., with or without a vapor space depending on whether the reactions are conducted batchwise or continuously. At these temperatures the containing vessel may be subject to considerable pressure, e.g. 400–500 p.s.i. for butadiene-1,3 polymerization, and for other more volatile materials employable in accordance with this invention the pressures may range upward to several thousand pounds per square inch, e.g. 5,000 to 8,000 p.s.i. for copolymerization of butadiene and ethylene. As all of these polymerization reactions are exothermic, it is important that the reaction systems chosen have adequate heat transfer in order to avoid run-away reactions. The time of polymerization may vary with the materials and temperatures employed, and may range from about one-half hour to 5 hours or more, a time of from 1 to 3 hours usually being sufficient to obtain an adequate conversion of monomers at selected temperatures, as illustrated in the adjoined examples. Control of the aging of the unsaturated polymer product in the presence of the residual or added hydrogen peroxide and/or mutual solvent before or after stripping of the monomers and/or solvents, which may be expedited by heating, effects control of the oxygen content, more particularly the hydroxyl content, of the polymer product.

Typical stripping procedures referred to in the earlier examples, such as vacuum and heat with or without steam, were employed in the examples throughout and exemplify any suitable way of recovering the polymer produced.

EXAMPLES

The following examples will serve to illustrate the invention in more detail:

EXAMPLES 1 THROUGH 4

In the examples 1 through 4 of Table I were employed 4 glass bottles each containing 3 ml of aqueous 50 percent by weight hydrogen peroxide and to 3 of these bottles were added respectively 1 ml, 2 ml and 3 ml of water and further to each of the 4 bottles were added 45 ml of isopropanol (the mutual solvent-diluent abbreviated as M–S–D) and 25 grams of butadiene-1,3. The bottles were capped and placed in a steam pressure chamber and held at 110° C. for 3 hours. After cooling the bottles were opened and from the polybutadiene therein was removed the volatiles e.g., butadiene-1,3, butadiene dimer, isopropanol, acetone, residual hydrogen peroxide, water etc. and this was accomplished with the aid of heat and vacuum, followed by steam and vacuum. The resulting products were clear, colorless, viscous liquid polybutadienes. For a tabulation of the ingredients employed, polymerization conditions and polymer yield for examples 1 through 4, see Table I hereafter.

These examples 1 through 4 teach that aqueous hydrogen peroxide throughout the concentration range of 25 to 50 percent can be employed with little appreciable change in polymer yield provided the quantity of mutual solvent-diluent remains constant.

TABLE I.—LIQUID POLYBUTADIENE

[Effect of aqueous concentration of hydrogen peroxide on butadiene conversion]

| Example number | Monomer material, butadiene-1,3 (grams) | M-S-D-isopropanol (ml.) | Hydrogen peroxide, aqueous Percent wt. $H_2O_2$ | (Ml.) | Polymerization, temp., °C./ time, hours | Polybutadiene, yield (grams) |
|---|---|---|---|---|---|---|
| 1 | 50 | 45 | 50 | 3 | 110/3 | 34 |
| 2 | 50 | 45 | 37.5 | 4 | 110/3 | 36 |
| 3 | 50 | 45 | 30 | 5 | 110/3 | 36 |
| 4 | 50 | 45 | 25 | 6 | 110/3 | 36 |

EXAMPLES 5 thru 8

Example 5, Table II shows that low yields of rubbery polymer are obtained when no mutual solvent-diluent is employed. Example 6, Table II, shows that when the volume of mutual solvent-diluent employed is equal to the volume of aqueous hydrogen peroxide then the yield of polybutadiene is almost doubled when compared with example 5 in which no mutual solvent-diluent was employed. In example 7, Table II, when sufficient mutual solvent-diluent was used to insure that a single homogeneous phase existed and in this example the polymer yield was increased 4 fold when compared with the polymer yield of example 5 in which no mutual solvent-diluent was used. In example 8, Table II, the mutual solvent-diluent was employed in amounts further exceeding the amount of monomer material and this excess mutual solvent-diluent showed little effect when compared with example 7, Table II.

In all the examples 5 through 8 the polymer was freed of volatile material, e.g. butadiene-1,3, butadiene dimer, isopropanol, acetone, residual hydrogen peroxide, etc. and this was accomplished with the aid of heat and vacuum followed by steam and vacuum. Products of examples 7 and 8 were colorless, viscous liquid polybutadienes. For a tabulation of the ingredients, conditions and polymer yields for examples 5 through 8, see Table II hereafter.

In short, conjugated hydrocarbon diene and aqueous hydrogen peroxide when combined form a two phase system and when polymerized at elevated temperatures give low yields of a rubbery polymer containing insoluble material. In contrast when mutual solvent-diluent is employed according to this invention one obtains lower molecular weight polymers, free of insoluble material, in satisfactory yields.

EXAMPLE 9 THROUGH 17

Alcohol as mutual solvent-diluent has been employed in examples 9-17, Table III. The conversion obtained with these $C_1$ to $C_4$ water miscible alcohols is of the same order of magnitude therefor in selecting an alcohol other factors are considered such as price considerations, stability of the alcohol to oxidation, effect of the alcohol on molecular weight of the polymer, solubility of the polymer in such alcoholic systems during the polymerization cycle, and ease of removal of the alcohol during recovery of the polymer. In many of the examples hereinafter isopropanol has been chosen as a preferred mutual solvent-diluent. Also, examples 11, 12 and 17 are examples employing anhydrous hydrogen peroxide.

For tabulation of the ingredients employed, polymerization conditions and polymer yields for examples 9 through 17 see Table III hereinafter.

TABLE III.—Liquid Polybutadiene

[Effect of various alcoholic mutual-solvent-diluents on butadiene conv.]

| Example No. | Monomer material, butadiene-1,3 (grams) | Hydrogen peroxide, 50% wt. aqueous (ml.) | M-S-D alcohol Type | Ml. | Polymerization Temp., °C. | Time (hrs.) | Polybutadiene Yield (grams) | Viscosity (Gardner) |
|---|---|---|---|---|---|---|---|---|
| 9 | 100 | 6 | Methanol | 60 | 115-120 | 3 | 72 | Z-6 |
| 10 | 100 | 6 | Ethanol | 60 | 115-120 | 3 | 70 | Z-6 |
| 11 | 100 | *6 | do | 60 | 115-120 | 3 | 70 | Z-6 |
| 12 | 100 | *6 | n-propanol | 60 | 115-120 | 3 | 76 | Z-6 |
| 13 | 100 | 6 | Isopropanol | 60 | 115-120 | 3 | 72 | Z-6 |
| 14 | 100 | 6 | n-butanol** | 60 | 115-120 | 3 | 66 | Z-4-5 |
| 15 | 100 | 6 | sec-butanol | 60 | 115-120 | 3 | 60 | Z-6 |
| 16 | 100 | 6 | t-butanol | 60 | 115-120 | 3 | 68 | Z-6 |
| 17 | 100 | *6 | do | 60 | 115-120 | 3 | 62 | Z-6 |

*The aqueous hydrogen peroxide was first combined with the alcohol and then shaken with anhydrous sodium sulfate to remove substantially all of the water thus producing an anhydrous hydrogen peroxide the limiting value of category (a) Table E.
**In place of the n-butanol may be substituted 2-methyl-1-propanol.

EXAMPLES 18 THROUGH 28

The effect of various mutual solvent-diluents on the polymerization of isoprene is set forth in examples 18 through 28, Table VII. These examples illustrate a range of mutual solvent-diluents which can be employed with isoprene as well as the other monomers set forth under monomer material herein especially aqueously miscible alcohols, ketones, keto-alcohols, etc.

For a tabulation of the ingredients employed, polymerization conditions, polymer yields, for examples 18 through 28, see Table IV hereinafter.

TABLE II.—LIQUID POLYBUTADIENE

[Effect of mutual-solvent-diluent concentrations on butadiene conversion]

| Example number | Monomer material, butadiene-1,3 (grams) | M-S-D-isopropanol (ml.) | Hydrogen peroxide, aqueous Percent wt. H$_2$O$_2$ | Ml. | Polymerization, temp., °C./ time, hours | Polybutadiene Yield (grams) | Insolubles (grams) | Viscosity (Gardner) |
|---|---|---|---|---|---|---|---|---|
| 5 | 100 | | 50 | *6 | 120/2 | 12 | 1.8 | Rubbery. |
| 6 | 100 | 6 | 60 | *6 | 120/2 | 20.8 | 0.1 | Semi-rubbery |
| 7 | 100 | 30 | 50 | **6 | 120/2 | 44 | 0.0 | Z-4 |
| 8 | 100 | 106 | 60 | **6 | 120/2 | 42 | 0.0 | Z-6 |

* Two phase system before polymerization initiated.
** Single phase system before polymerization initiated.

TABLE IV.—LIQUID POLYISOPRENE

[Effect of mutual-solvent-diluent type on isoprene conversion]

| Example number | Monomer material isoprene (grams) | Hydrogen peroxide 50% wt. aqueous (ml.) | M-S-D (type) | (ml.) | Polymerization Temp. (°C.) | Time (hrs.) | Polyisoprene Yield (grams) | Conversion (percent wt.) | Ref. index $N_D^{27}$ |
|---|---|---|---|---|---|---|---|---|---|
| 18 | 25 | 1.5 | Methanol | 20 | 110 | 4 | 13.5 | 54 | 1.5157 |
| 19 | 25 | 1.5 | Ethanol | 15 | 110 | 4 | 14.9 | 60 | 1.5161 |
| 20 | 25 | 1.5 | n-Propanol | 12 | 110 | 4 | 15.2 | 61 | 1.5161 |
| 21 | 25 | 1.5 | Isopropanol | 12 | 110 | 4 | 14.8 | 59 | 1.5168 |
| 22 | 25 | 1.5 | n-Butanol | 25 | 110 | 4 | 15.0 | 60 | 1.5170 |
| 23 | 25 | 1.5 | Isobutanol | 30 | 110 | 4 | 15.8 | 63 | 1.5161 |
| 24 | 25 | 1.5 | tert.-Butanol | 20 | 110 | 4 | 14.3 | 57 | 1.5.69 |
| 25 | 25 | 1.5 | Acetone | 25 | 110 | 4 | 11.1 | 44.5 | 1.5.72 |
| 26 | 25 | 1.5 | Methyl ethyl ketone | 60 | 110 | 4 | 7.3 | 29 | 1.5162 |
| 27 | 25 | 1.5 | Cellosolve | 21 | 120 | 4 | 20 | 80 | 1.5147 |
| 28 | 25 | 1.5 | Butyl Cellosolve | 14 | 120 | 4 | 20.6 | 82.5 | 1.5159 |

EXAMPLES 29 THROUGH 39

For examples 29 through 39 piperylene is polymerized with the aid of hydrogen peroxide and various alkanolic, alkanonic and alkanoic mutual solvents. Piperylene polymerizes more slowly than butadiene-1,3 and isoprene therefor longer polymerization periods are required. By increasing the polymerization temperature from 110° C. to 120°–125° C. the conversion of piperylene to polypiperylene can be increased.

For a tabulation of the ingredients employed, polymerization conditions, polymeric yields, for examples 29 through 39, see Table V hereinafter.

TABLE V.—LIQUID POLYPIPERYLENE
[Effect of mutual-solvent-diluent types on piperylene conversion]

| Example number | Monomer piperylene (grams) | Hydrogen peroxide 50% wt. aqueous (ml.) | M-S-D Type | Ml. | Polymerization Temp. (° C.) | Time (hrs.) | Polypiperylene Yield (grams) | Conversion (percent wt.) | Ref. index $N_D^{27}$ |
|---|---|---|---|---|---|---|---|---|---|
| 29 | 25 | 1.5 | Methanol | 50 | 110 | 8 | 8.1 | 32 | 1.5000 |
| 30 | 25 | 1.5 | Ethanol | 50 | 110 | 8 | 9.6 | 38 | 1.4997 |
| 31 | 25 | 1.5 | n-Propanol | 13 | 110 | 8 | 10.5 | 42 | 1.4988 |
| 32 | 25 | 1.5 | Isopropanol | 11 | 110 | 7 | 10.3 | 41 | 1.4981 |
| 33 | 25 | 1.5 | n-Butanol | 75 | 110 | 8 | 10.9 | 44 | 1.4990 |
| 34 | 25 | 1.5 | Isobutanol | 40 | 110 | 8 | 9.7 | 39 | 1.4991 |
| 35 | 25 | 1.5 | t-Butanol | 25 | 110 | 8 | 9.7 | 39 | 1.5001 |
| 36 | 25 | 1.5 | n-Amyl alcohol | 50 | 110 | 8 | 10.5 | 42 | 1.4988 |
| 37 | 25 | 1.5 | iso-Amyl alcohol | 50 | 110 | 8 | 10.5 | 42 | 1.4984 |
| 38 | 25 | 1.5 | Acetone | 25 | 110 | 8 | 8.1 | 32 | 1.4994 |
| 39 | 25 | 1.5 | Methyl ethyl ketone | 50 | 110 | 8 | 7.0 | 28 | 1.5000 |

EXAMPLES 40 THROUGH 45

Examples 40 to 45, Table VI illustrate the interpolymerization with the aid of hydrogen peroxide of isoprene and vinyl acetate employing as mutual solvent-diluent acetone, methylethyl ketone and isopropanol respectively. In example 45, Table VI an interpolymer is prepared of piperylene, styrene and α-methyl styrene.

For tabulation of ingredients employed, polymerization conditions and liquid polymer yields for examples 40 through 45, see Table VI hereinafter.

TABLE VI
[Interpolymers of conjugated dienes and vinylidene monomers]

| Example Number | 40 | 41 | 42 | 43 | 44 | 45 |
|---|---|---|---|---|---|---|
| Monomer material: | | | | | | |
| Isoprene, g | 50 | 50 | 50 | 50 | 50 | |
| Vinyl acetate, g | 4.2 | 4.2 | 2.1 | 2.1 | 2.1 | |
| Piperylene, g | | | | | | 24 |
| Styrene, g | | | | | | 3.6 |
| α-methyl styrene, g | | | | | | 2.4 |
| N-S-D: | | | | | | |
| Acetone, ml | 47 | | 45 | | | |
| Methylethyl ketone, ml | | 60 | | 65 | | |
| Isopropanol, ml | | | | | 25 | 10.5 |
| Hydrogen peroxide: | | | | | | |
| 50% wt. aqueous, ml | 3 | 3 | 3 | 3 | 3 | 1.7 |
| Polymerization: | | | | | | |
| Temp., °C | 110 | 110 | 110 | 110 | 110 | 110 |
| Time, hrs | 6 | 6 | 6 | 6 | 6 | 6 |
| Interpolymer: | | | | | | |
| Yield, g | 33 | 33 | 28 | 28 | 30 | 13 |
| Viscosity, (Gardner) | Z-6 | Z-6 | Z-6 | Z-6 | Z-6 | |

EXAMPLES 46 AND 47

In examples 46 and 47 Table VII butadiene-1,3 and styrene together with a small amount of a polar monomer is interpolymerized with aid of hydrogen peroxide and isopropanol as the mutual solvent-diluent.

For tabulation of ingredients employed, polymerization conditions and liquid polymer yields for examples 46 and 47, see Table VII hereinafter.

TABLE VII

Interpolymers from Butadiene and Vinylidene Monomers

| Example No. | 46 | 47 |
|---|---|---|
| Monomer Material | | |
| Acrylonitrile, ml. | 0.5 | |
| Methyl methacrylate, ml. | | 0.5 |
| Styrene, g. | 18 | 18 |
| Butadiene-1,3, g. | 32 | 32 |
| M - S - D | | |
| Isopropanol, ml. | 15 | 15 |
| Hydrogen Peroxide | | |
| 50% wt. aqueous, ml. | 2 | 2 |
| Polymerization | | |
| Temp. °C. | 115 | 115 |
| Time, hrs. | 2 | 2 |
| Interpolymer | | |
| Yield, g. | 44 | 46 |
| Viscosity(gardner) | Z-6 | Z-6 |

EXAMPLES 48 THROUGH 51

In examples 48 through 51 Table VIII with the aid of aqueous hydrogen peroxide and as mutual solvent-diluent isopropanol (except example 51 which employs acetone) isoprene is interpolymerized with various vinylidene including vinyl monomers.

For tabulation of ingredients employed, polymerization conditions and liquid polymer yields for examples 48 through 51 Table VIII hereinafter.

TABLE VIII
[Interpolymers of isoprene and vinylidene monomers]

| Example number | Isoprene (grams) | Other monomer Type | Grams | Hydrogen peroxide 50% wt. aqueous (ml.) | M-S-D one phase isopropanol (ml.) | Polymerization Temp. (° C.) | Time (hrs.) | Interpolymer Yield (grams) | Conversion (percent wt.) |
|---|---|---|---|---|---|---|---|---|---|
| 48 | 25 | Methyl isopropenyl ketone | 25 | 1.5 | 8 | 120 | 4 | 37 | 80 |
| 49 | 25 | Methacrolein | 25 | 1.5 | 10 | 120 | 4 | 30 | 65 |
| 50 | 25 | Acrylonitrile | 25 | 1.5 | 8 | 120 | 4 | 32.3 | 72 |
| 51 | 25 | do | 8 | 1.5 | *20 | 120 | 4 | 22.5 | 90 |

*Acetone.

EXAMPLES 52 THROUGH 55

In examples 52 through 54 Table IX, butadiene-1,3 is interpolymerized with 2-vinyl pyridine with the aid of hydrogen peroxide and a mutual solvent-diluent isopropanol. Example 55 is an interpolymer of isoprene and 2-vinyl pyridine. Polymers from examples 54 and 55 can be made water soluble with the aid of acid e.g. phosphoric acid.

For tabulation of the ingredients employed, polymerization conditions and polymer yields for examples 52 through 55 see Table IX hereinafter.

TABLE IX
Interpolymers from Vinyl Pyridine

| Example No. | 52 | 53 | 54 | 55 |
|---|---|---|---|---|
| Monomer Material | | | | |
| 2-Vinyl Pyridine, g. | 5 | 9 | 12.5 | 12.5 |
| Butadiene-1,3, g. | 20 | 16 | 12.5 | |
| Isoprene, ml. | | | | 18 |
| M - S - D | | | | |
| Isopropanol, ml. | 9 | 8 | 8 | 8 |
| Hydrogen Peroxide | | | | |
| 50% wt. aqueous, ml. | 1.5 | 1.5 | 1.5 | 1.5 |
| Polymerization | | | | |
| Temperature, °C. | 120 | 120 | 120 | 120 |
| Time, hours | 2 | 2 | 2 | 3 |
| Interpolymer | | | | |
| Yield, g. | 16.4 | 18.4 | 23.5 | 19.1 |

EXAMPLES 56 AND 57

In examples 56 and 57 isoprene is polymerized with aqueous hydrogen peroxide and mutual solvent-diluent composition; for example 56 is employed the mixture boiling at 80.6° C. which is the azeotrope consisting of 31 percent by weight toluene and 69 percent by weight isopropanol and for example 57 is employed the mixture boiling at 63.8° C. which is the azeotrope consisting of 28 percent by weight toluene and 72 percent by weight methanol. In place of the constant boiling azeotrope mutual solvent-diluent mixtures set forth in examples 56 and 57 may be used other azeotropic mixtures of two or more mutual solvent-diluents or of mutual solvent-diluents and solvents for the monomer material only e.g. toluene, benzene, ethyl benzene, methylchloride, etc., or for the hydrogen peroxide; provided of course the azeotrope combination is itself a mutual solvent-diluent for both the monomer material and the hydrogen peroxide, as will be appreciated by one skilled in the art.

For tabulation of the ingredients employed, polymerization conditions and polymer yields for examples 56 and 57 see Table X hereinafter.

TABLE X

Mixed Mutual Solvent-Diluent Forming Azeotropic Boiling Mixture

| Example No. | 56 | 57 |
|---|---|---|
| Monomer Material | | |
| Isoprene, g. | 25 | 25 |
| Mutual Solvent-Diluent* | | |
| *Forming Azeotropic | | |
| boiling mixtures, ml. | 16 | 28 |
| Composition | | |
| Toluene, g. | 31 | 28 |
| Isopropanol, g. | 69 | |
| Methanol, g. | | 72 |
| Hydrogen Peroxide | | |
| 50% wt. aqueous, ml. | 1.5 | 1.5 |
| Polymerization | | |
| Temp. °C. | 120 | 120 |
| Time, hours | 3 | 3 |
| Interpolymer | | |
| Yield, g. | 15.2 | 16.4 |

EXAMPLES 58 THROUGH 61

In these examples 58 through 61 Table XI isoprene is polymerized with the aid of a mutual solvent-diluent and aqueous hydrogen peroxide and a stabilizer for the latter. When polymerizing conjugated diene monomers like butadiene-1,3, isoprene and piperylene including interpolymers of these it is important that the hydrogen peroxide should remain stable and not release oxygen which can gel the polymer at elevated polymerization temperatures especially at the metal surfaces of the reactor. In examples 58 through 61 various stabilizers for aqueous hydrogen peroxide have been added and the conversion of isoprene to polyisoprene determined.

For tabulation of the ingredients employed, polymerization conditions and polymer yields for examples 58 through 61 see Table XI hereinafter.

TABLE XI
Effect of Hydrogen Peroxide Stabilizers

| Example No. | 58 | 59 | 60 | 61 |
|---|---|---|---|---|
| Monomer Material | | | | |
| Isoprene, g. | 25 | 25 | 25 | 25 |
| Mutual Solvent-Diluent | | | | |
| Isopropanol, ml. | 12 | 12 | 12 | 12 |
| Hydrogen Peroxide | | | | |
| 50% wt. Aqueous, ml. | 1.5 | 1.5 | 1.5 | 1.5 |
| Hydrogen Peroxide Stabilizer | | | | |
| Boric acid, g. | 0.1 | | | |
| Sodium borate, g. | | 0.1 | | |
| Phosphoric acid, g. | | | 0.1 | |
| Potassium Pyrophosphate | | | | 0.1 |
| Polymerization | | | | |
| Temp. °C. | 120 | 120 | 120 | 120 |
| Time, hrs. | 3 | 3 | 3 | 3 |
| Interpolymer | | | | |
| Yield, g. | 16.6 | 14.7 | 16.5 | 14.3 |

EXAMPLES 62 THROUGH 67

Table XII illustrates typical polybutadienes prepared in accordance with the present invention for which the number average molecular weights were determined by depression of melting point. Example 63 illustrates that when the mutual solvent-diluent selected is methanol, then the molecular weight of the polymer is lower. Thus, by a combination of the use of methanol, especially in amounts greater than required to form a single phase with the monomer material and aqueous hydrogen peroxide, and the use of greater quantities of hydrogen peroxide to provide hydroxyl groups, the molecular weight will be reduced below a number average molecular weight of 1,000 and even to the value of 500 or thereabouts.

Conversely by introducing the aqueous hydrogen peroxide in small portions, or continuously, throughout the course of the polymerization and employing a mutual solvent-diluent composition which is a good solvent for the polymer formed, the molecular weight may be increased to values of the order of 5,000 to 10,000.

Example 66, Table XII is a copolymer of butadiene and styrene prepared with t.-butanol as the mutual solvent-diluent, and having a weight average molecular weight of about 1,400, indicating the effectiveness of the tertiary alcohol solvent-diluent.

Example 67, Table XII, yielded a polybutadiene typical of the polymers produced at least in part from hydrocarbon conjugated dienes in accordance with this invention. The infrared spectrum of this polybutadiene of example 67 in the significant range of 10 to 15 micron wavelengths is set forth in FIG. 10, and shows a structure predominately (about 75 percent) of 1,4-configuration, which in turn is predominately of trans 1,4-configuration (i.e. about 85 percent trans), with only the minor remaining portion being of cis 1,4-configuration.

Figure 1:
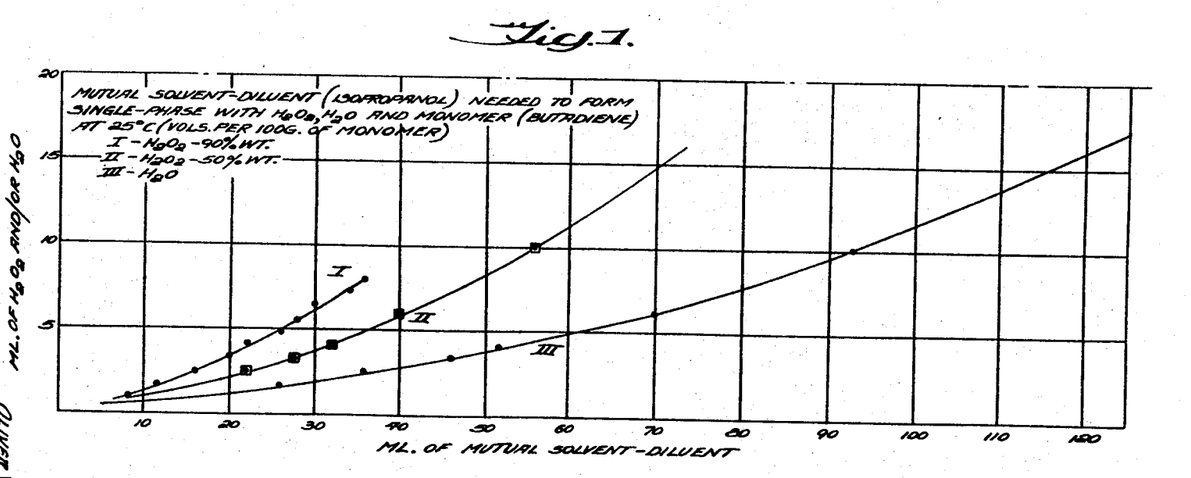
FIG. 1 Butadiene-1,3–Aqua $H_2O_2$–Isopropanol
FIG. 2 Isoprene–Aqua $H_2O_2$–Methanol
FIG. 3 Isoprene–Aqua $H_2O_2$–Isopropanol
FIG. 4 Isoprene–Aqua $H_2O_2$–Methyl ethyl ketone
FIG. 5 Piperylene–Aqua $H_2O_2$–Isopropanol
FIG. 6 Styrene–Aqua $H_2O_2$–Methanol
FIG. 7 Styrene–Aqua $H_2O_2$–Isopropanol
FIG. 8 Vinylidene chloride–Aqua $H_2O_2$–Isopropanol
FIG. 9 Methyl methacrylate–Aqua $H_2O_2$–Isopropanol
Figure 2:
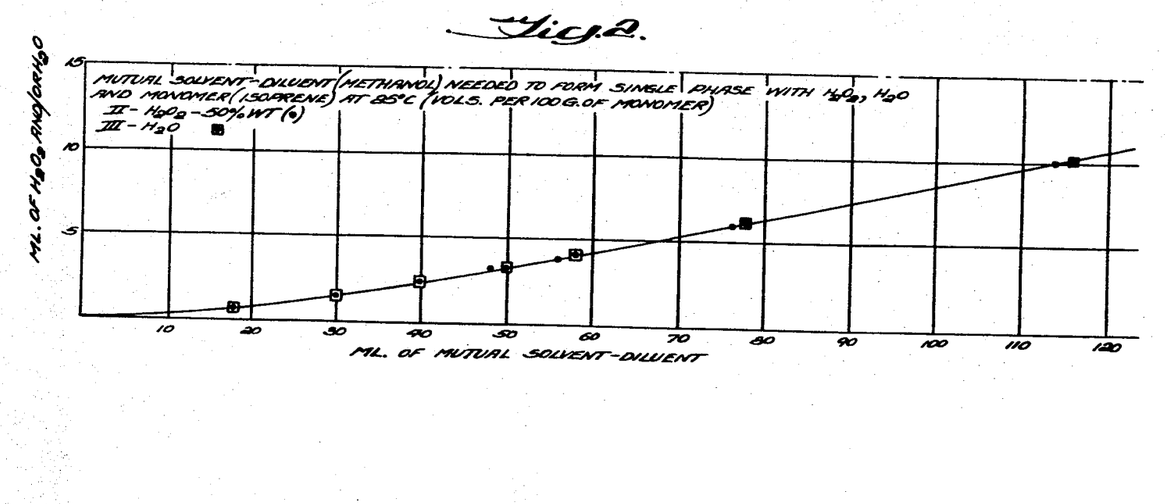
Figure 3:
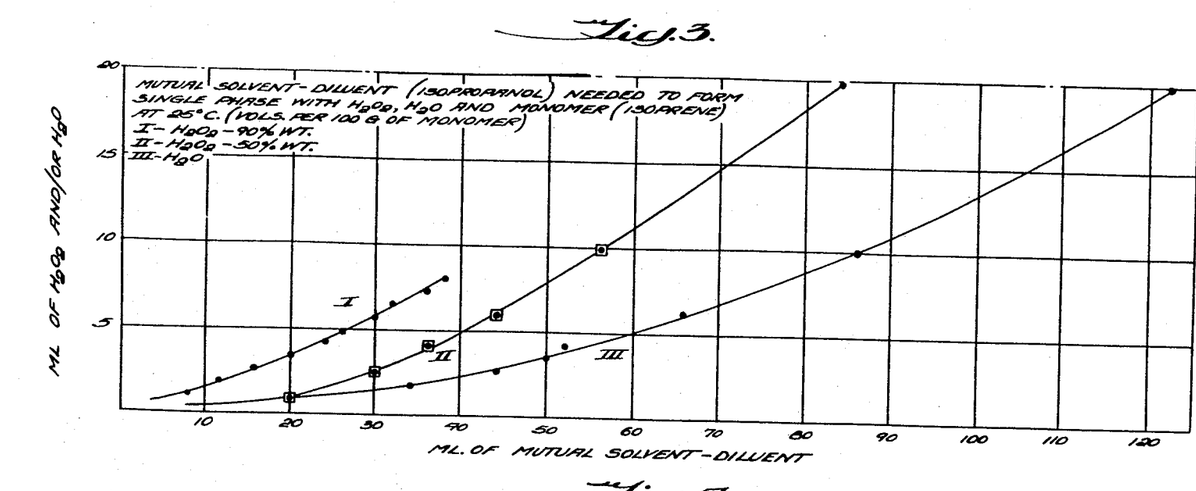
Figure 4:
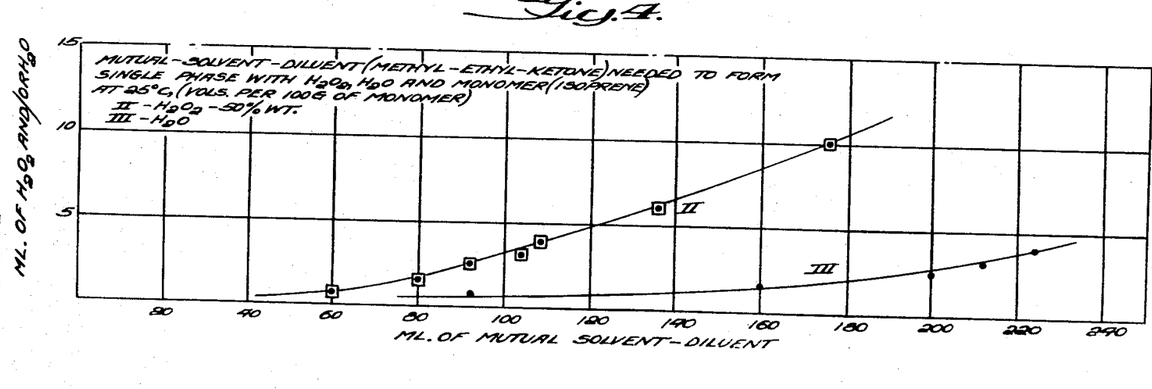
Figure 5:
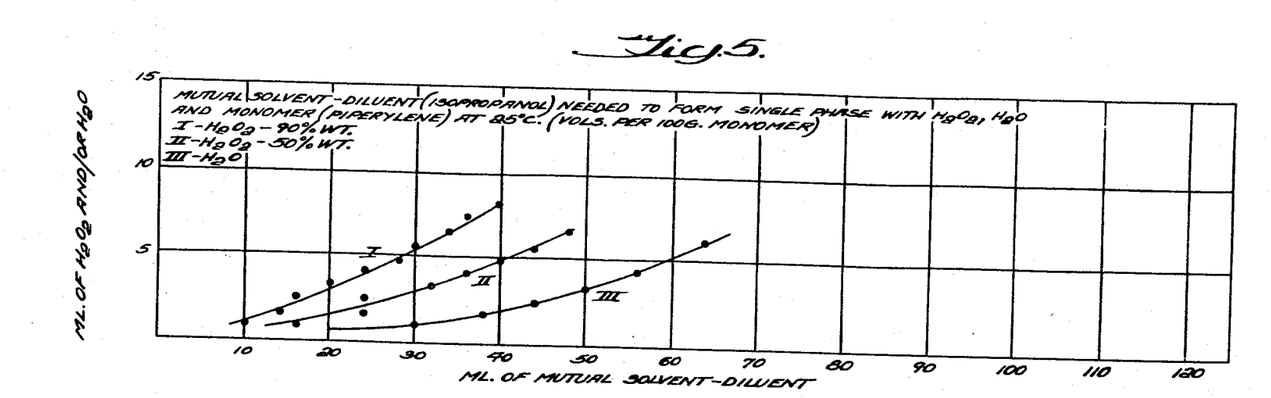
Figure 6:
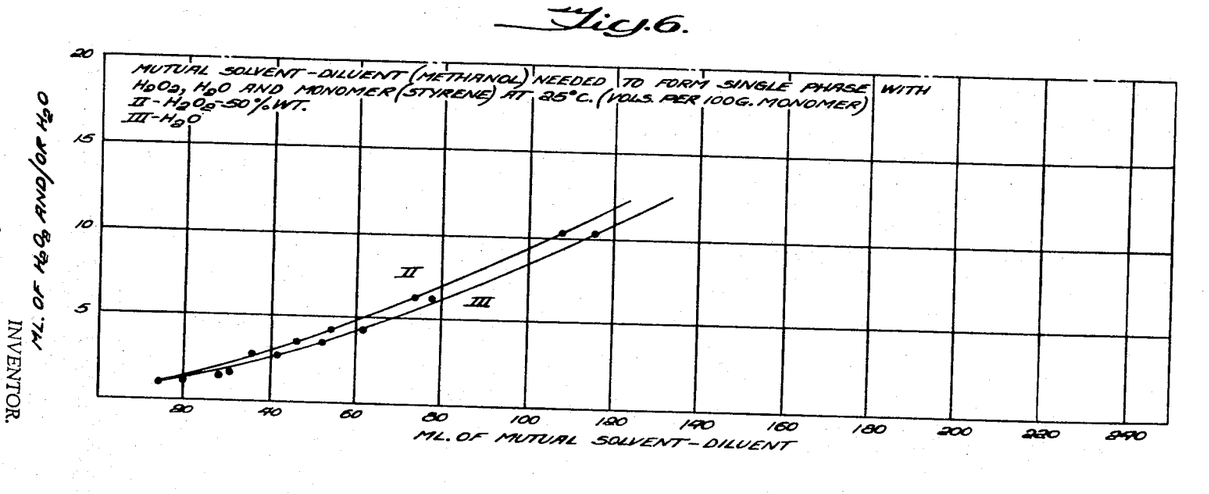
Figure 7:
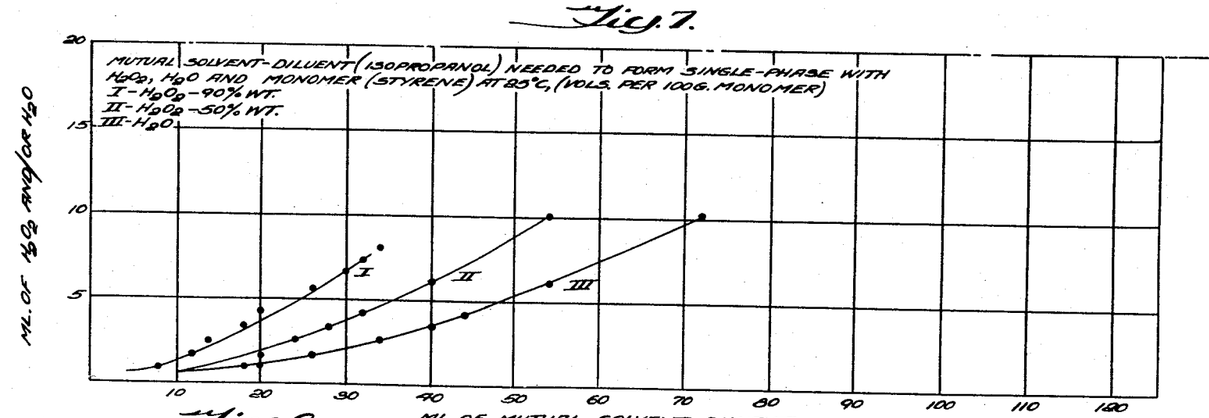
Figure 8:
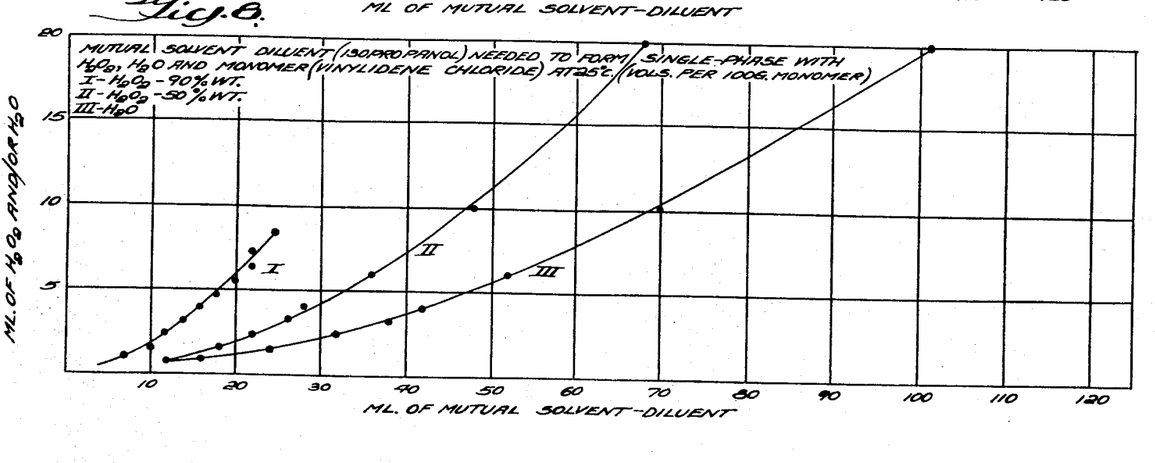
Figures 9, 10:
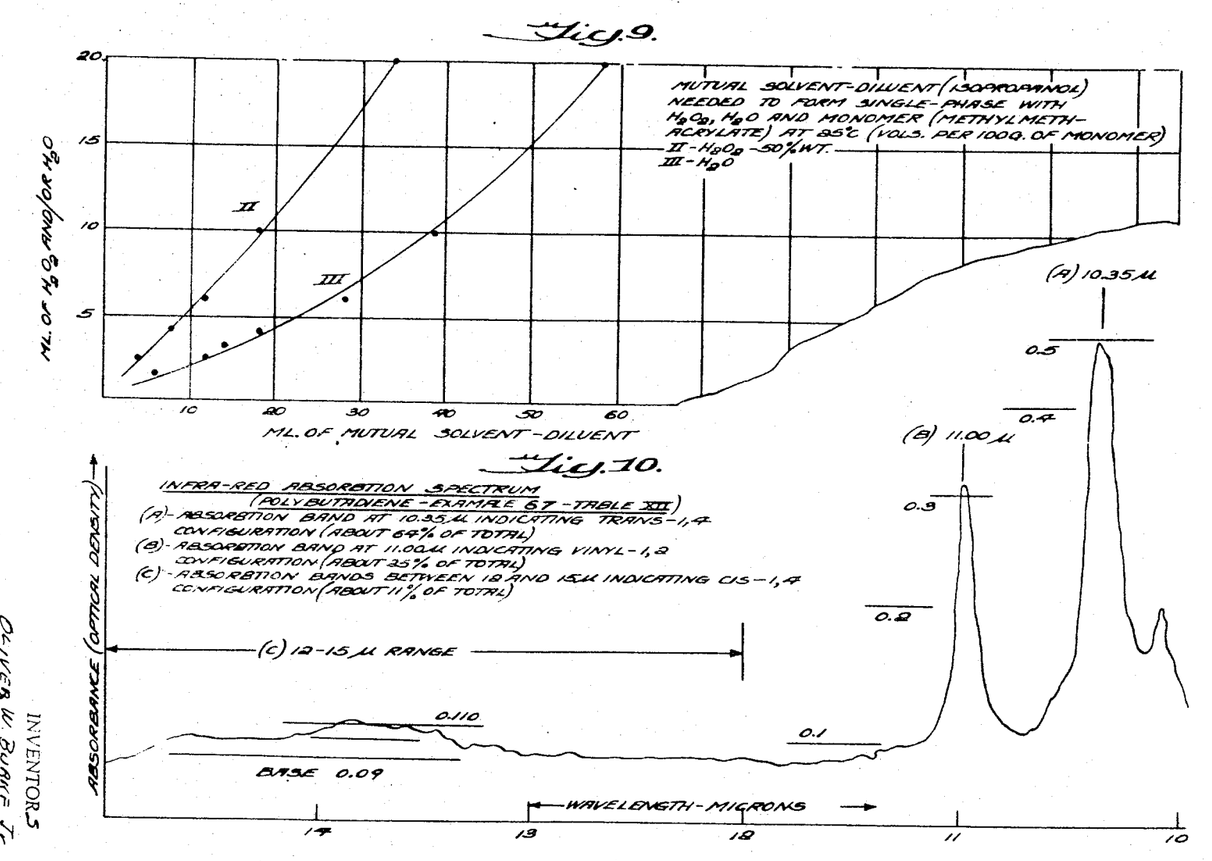

Likewise, the infrared spectrum of the liquid copolymer of example 66 showed the same predominate proportion of trans 1,4-configuration for the diene derived portion of the interpolymer. This characteristic of the new polymers clearly distinguishes them from liquid polybutadienes and butadiene-vinyl copolymers prepared by alkali-metal polymerization and the like; for example, the Enjay Polymer MD–420, (produced by Standard Oil Company of New Jersey) a butadiene-styrene copolymer containing 10–20 percent styrene, has an infrared spectrum indicative of a structure which is predominately of 1,2-configuration (i.e. 70 percent 1,2-configuration) and which contains only a minor proportion of 1,4-configuration (i.e. about 10 percent) with the remainder consisting of styrene units.

Similarly the unsaturated polymers of the present invention, which are polymers of the aforesaid configuration with quite low molecular weights, are quite distinct from the butadiene polymers and copolymers and the like produced by emulsion polymerizations, which are typically characterized, inter alia, by being solid polymer of relatively high molecular weights.

TABLE XII

Molecular Weight Examples

| Example no. | 62 | 63 | 64 | 65 | 66 | 67* |
|---|---|---|---|---|---|---|
| Monomer material | | | | | | |
| Butadiene-1,3, g. | 100 | 100 | 100 | 100 | 80 | 100 |
| Styrene, g. | | | | | 20 | |
| Mutual solvent-diluent | | | | | | |
| Isopropanol, ml. | 35 | | 35 | 35 | | |
| Methanol | | 38 | | | | |
| Tert. Butanol | | | | | 40 | 30 |
| Hydrogen Peroxide 50% wt. aqueous, ml. | 4.15 | 2 | 2 | 2 | 3 | 3 |
| Polymerization Temp. °C. | 115 | 110 | 115 | 120 | 115 | 120 |
| Time, hours | 3 | 4 | 3 | 7.5 | 2 | 2 |
| Polymer Yield, g. | 55 | 45.5 | 57 | 70 | 37.3 | 48 |
| Polymer properties | | | | | | |
| Molecular weight (1) | 1600 | 1800 | 2300 | 2500 | 1400 | — |
| Intrinsic viscosity(2) | 0.26 | 0.15 | 0.27 | — | — | — |

(1) $M_n$ by freezing point determination in benzene
(2) dilute solution viscosity
* For infrared spectra see FIG. 10.

CONTINUOUS POLYMERIZATION

While the foregoing examples 1 through 67 were for the most part performed by batchwise polymerization, the invention can be adapted for continuous polymerization, and as above noted such continuous polymerization has advantages not only from the procedural standpoint but also from the standpoint of product characteristics. Such adaptation may conveniently be effected in accordance with the following typical examples 68 and 69.

EXAMPLE 68

For effecting a continuous polymerization in this example was employed a single, jacketed, cylindrical high-pressure tube of 3 inch internal diameter and 10 feet long, with hot water of about 113° C. under pressure circulated at 50 gallons per minute through the jacket, which maintained the polymerization temperature in the center of the tube at about 115° C. The reactants were pumped into one end of the tube by a high pressure positive displacement pump and the product was discharged at the remote end of the tube through a relief valve set at 500 p.s.i. The charge was prepared as follows: to each 1,400 grams of isopropanol was added 226 ml. of 50 percent by weight aqueous hydrogen peroxide, followed by 4,000 grams of butadiene-1,3.

In this example the butadiene-1,3 had been distilled to remove inhibitor (although such distillations is not required, as is shown by example 69). The resulting homogeneous solution or single phase was cooled and pumped to the reactor at the rate of 870 ml. per hour. The reactor effluent was first stripped of butadiene, and then with the aid of heat and vacuum the isopropanol and small amounts of acetone formed therefrom were removed, and the polybutadiene was then freed of butadiene dimer, water, and traces of hydrogen peroxide with the aid of vacuum and steam stripping. A 3,193 gram sample of the reactor effluent yielded 1,026 grams of polymer, which represented a butadiene conversion of 45 percent. The polymer was a water white viscous liquid having a Gardner viscosity between Z-5 and Z-6.

EXAMPLE 69

Using a reactor comprising two of the tubes according to example 68, heated as therein set forth, and connected in series with a single relief valve at the discharge end of the second tube, there is prepared and supplied to the inlet end of the first tube a charge of the following proportions: to each 892 grams of isopropanol are added 150 ml. of 50 percent by weight aqueous hydrogen peroxide, followed by 2,550 grams of butadiene-1,3 (undistilled), the charge being pumped to the inlet of the first tube at such rate as to provide an average residence time in the first tube of 2 hours. To the said charge passing from the first tube to the second tube is added, by pumping, a supplemental charge prepared as follows: to each 158 grams of isopropanol is added 25 ml. of 50 percent by weight aqueous hydrogen peroxide, followed by 450 grams of styrene, the styrene-containing single phase feed being supplied in the proportion of 670 grams to each 3,600 grams of the butadiene-containing single phase feed. The polymer containing effluent from the 500 p.s.i. discharge valve is stripped as in the previous example (with the unreacted styrene also being removed by the steam-vacuum stripping) to product a water white viscous interpolymer of butadiene and styrene of about 85/15 weight ratio, in about 75 percent yield based on the weight of monomers charged.

While for convenience and simplicity in the present example, one supplemental charge is fed at about the mid position that is between the two tubular reactors connected in series, the invention further contemplates the employment of additional and/or different supplemental charges and the introduction thereof at other and different locations, as desired. By proper supplemental feeds of monomer streams, hydrogen peroxide and mutual solvent-diluent or other diluent streams, and with or without modifiers, substantial flexibility of processing may be effected.

While for examples 68 and 69 tubular reactors are employed, the invention is not limited thereto, and continuous polymerizations may be practiced in other forms of continuous reactors, for example, in a series of stirred pot reactors.

To the polymer materials of this invention having residual unsaturation may be added antioxidants either before or after stripping, however, the use of antioxidants has not been found essential when the polymer products are stored in air-tight containers.

The residual monomers, the selected single or mixed mutual solvent-diluent and the hydrogen peroxide can be removed with the aid of heat and vacuum, and/or may be destroyed chemically as by treating with formaldehyde.

EXAMPLES 70 THROUGH 74

In examples 70 through 74, Table XIII various vinylidene monomers are polymerized with the aid of aqueous hydrogen peroxide and the mutual solvent-diluent isopropanol. The vinylidene monomers containing only a single unsaturated group are polymerized at about 120° C. and even higher temperatures can be employed especially where lower molecular weight polymer products are desired. The products of these examples were solids.

For tabulation of the ingredients employed, polymerization conditions and polymer yields for examples 70 through 74, see Table XIII hereinafter.

TABLE XIII

[Polymers from vinylidene monomers]

| Example number | Monomer material (Type) | (Ml.) | Hydrogen peroxide (50% wt. aqueous) (ml.) | M-S-D (isopropanol) (ml.) | Polymerization Temp. (° C.) | Time (hrs.) | Polymer Yield (g.) | Conversion (percent wt.) |
|---|---|---|---|---|---|---|---|---|
| 70 | Styrene | 25 | 1.5 | *10 | 120 | 4 | 24.9 | 99.6 |
| 71 | Vinyl acetate | 25 | 1.5 | *5+3 | 120 | 4 | 17.6 | 70.4 |

TABLE XIII – Continued

[Polymers from vinylidene monomers]

| Example number | Monomer material (Type) | Hydrogen peroxide (50% wt. aqueous) (Ml.) | M-S-D (isopropanol) (ml.) | Polymerization Temp. (°C.) | Polymerization Time (hrs.) | Polymer Yield (g.) | Polymer Conversion (percent wt.) |
|---|---|---|---|---|---|---|---|
| 72 | Ethyl methacrylate | 25 | 1.5 | *7+1 | 120 | 4 | 24.0 | 96 |
| 73 | Acrylonitrile | 25 | 1.5 | *3+5 | 120 | 4 | 17.1 | 68.4 |
| 74 | Acrolein | 25 | 1.5 | *8 | 120 | 4 | 14.4 | 57.6 |

*To produce single phase.

EXAMPLE 75

Example 75 is of a homopolymer of 2-vinyl pyridine. Polymers according to example 75 can be made water soluble with the aid of acid e.g. phosphoric acid.

For tabulation of the ingredients employed, polymerization conditions and polymer yield for example 75 see Table XIV hereinafter.

TABLE XIV
Polymers from Polar Monomers

| | |
|---|---|
| Example No. | 75 |
| Monomer Material | |
| 2-Vinyl Pyridine, g. | 25 |
| M-S-D | |
| Isopropanol, ml. | 8 |
| Hydrogen Peroxide | |
| 50% wt. aqueous, ml. | 1.5 |
| Polymerization | |
| Temp., °C. | 120 |
| Time, hours | 3 |
| Interpolymer | |
| Yield, g. | 24.7 |

EXAMPLES 76 AND 77

Example 76, Table XV exemplifies how styrene can be polymerized with the aid of aqueous hydrogen peroxide and a mutual solvent-diluent composition consisting of the 80.6° C. boiling azeotrope of the composition 31 percent by weight toluene and 69 percent by weight, isopropanol. In example 77 again styrene is polymerized with the aid of aqueous hydrogen peroxide and a mutual solvent-diluent composition consisting of the 55.5° C. boiling azeotrope of 88 percent by weight acetone and 12 percent by weight methanol. In place of the constant boiling azeotrope mutual solvent-diluent mixtures set forth in examples 76 and 77 may be used other azeotropic mixtures of two or more mutual solvent-diluents or of mutual solvent-diluents and solvents for the monomer material only e.g. toluene, benzenes ethyl benzene, methylchloride, etc., provided of course the azeotrope mutual solvent with or without diluent combination is itself a mutual solvent-diluent for both the monomer material and the hydrogen peroxide, as will be appreciated by one skilled in the art.

The use of an alkanolic and/or alkanonic mutual solvent and a solvent for the styrene polymer such as benzene in quantities which form azeotropic boiling mixture, and using hydrogen peroxide as the catalyst, provides a very suitable means of obtaining polystyrene in a solution form which can readily be foamed to produce polystyrene foam.

For tabulation of the ingredients employed, polymerization conditions and polymer yields for examples 76 and 77, see Table XV hereinafter.

TABLE XV
Mixed Mutual Solvent-Diluent Forming Azeotropic Boiling Mixture

| | | |
|---|---|---|
| Example No. | 76 | 77 |
| Monomer Material | | |
| Styrene, g. | 25 | 25 |
| Mutual Solvent-Diluent* | | |
| *Forming Azeotropic boiling mixtures, ml. | 14.5 | 18 |
| Composition | | |
| Toluene, g. | 31 | |
| Isopropanol, g. | 69 | |
| Acetone, g. | | 88 |
| Methanol, g. | | 12 |
| Hydrogen Peroxide | | |
| 50% wt. aqueous, ml. | 1.5 | 1.5 |
| Polymerization | | |
| Temp. °C. | 120 | 120 |
| Time, hours | 3 | 3 |
| Interpolymer | | |
| Yield, g. | 25 | 24.7 |

EXAMPLE 78

Example 78 Table XVI, is an example of polystyrene prepared in accordance with the present invention which has a number average molecular weight of about 2,000, and which is recovered as a solid powder, and has particular utility for purposes for which a low molecular weight polystyrene is desired.

TABLE XVI
Molecular Weight Examples

| | |
|---|---|
| Example No. | 78 |
| Monomer Material | |
| Styrene, g. | 100 |
| Mutual Solvent-Diluent | |
| Isopropanol, ml. | 40 |
| Hydrogen Peroxide | |
| 50% wt. aqueous, ml. | 3 |
| Polymerization | |
| Temp., °C. | 120 |
| Time, hours | 4 |
| Polymer | |
| Yield, g. | 100 |
| Polymer Properties | |
| Molecular weight (1) | 1900 |

(1) $M_n$ by freezing point determination in benzene

In examples 1 through 78 hereof have been described processes of polymerizing and interpolymerizing ethylenically unsaturated monomer material of the type specified herein, with the aid of hydrogen peroxide (with or without hydrogen peroxide stabilizers) and a liquid organic mutual solvent-diluent of the type specified herein with or without other diluents, and in these examples it is to be understood that other monomer materials as set forth under monomer material herein may be substituted for the monomers employed and the amount and strength of the hydrogen peroxide may be adjusted to give satisfactory polymerization rates and depending on the monomer material and the amount and concentration of hydrogen peroxide employed an amount and kind of mutual solvent-diluent must be used sufficient to afford a single phase before polymerization commences as will be appreciated by one skilled in the art taught by the examples hereof and the description of the invention.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive to the invention, the scope of which is defined in the appended claims, and that all modifications that come within the meaning and range of equivalency of the claims are intended to be included therein.

We claim:

1. A method for forming a polymer material having terminal hydroxyl groups and a number average molecular weight in the range of from 500 to 10,000, which method comprises:
   A. forming a single phase polymerization system of a combination of
      1. monomer material consisting essentially of one or more polymerizable ethylenically unsaturated monomers, at least one of which has one or more substituents other than hydrogen, said monomer material consisting essentially of from 2 to 100 percent by weight of material having a water solubility at 20° C. of no more than 3.5 weight percent and from 0 to 98 percent by weight of material having a water solubility at 20° C. greater than 3.5 weight percent, said ethylenically unsaturated monomer materials being selected from the class of ethylenically unsaturated compounds which excludes the drying oil substances and the non-conjugated polyene compounds which are other than drying oil substances, 2. between 0.5–10 parts by weight of hydrogen peroxide per 100 parts of monomer, 3. a liquid organic mutual solvent-diluent for all the monomer material present and said hydrogen peroxide and any water present, said liquid organic mutual solvent diluent comprising at least a major proportion of lower aliphatic saturated oxygenated solvent selected from the class consisting of the water miscible alcohols, ether-alcohols, keto-alcohols and ketones, said system being essentially free of oxygen and of components that decompose hydrogen peroxide to form oxygen at less than 100° C., and B. heating said system at sufficient temperatures in the range of from above 100° C. to about 200° C. for a sufficient time to initiate and effect polymerization.

2. A method according to claim 1, wherein at least the major proportion of the liquid organic mutual solvent is selected from those of said class of solvents which contain alcoholic hydroxyl groups.

3. A method according to claim 1, wherein at least the major proportion of the liquid organic mutual solvent is selected from the $C_1$ to $C_4$ alcohols.

4. A method according to claim 1, wherein at least the major proportion of the liquid organic mutual solvent is isopropanol.

5. A method according to claim 1, wherein the ethylenically unsaturated monomer material with which the single phase is formed is selected from those of the designated monomers which contain not more than 14 carbon atoms.

6. A method according to claim 5, wherein the ethylenically unsaturated monomer material with which the single phase is formed consists essentially of monomer selected from the class consisting of the vinylidene monomers and conjugated diene monomers.

7. A method according to claim 6, wherein the ethylenically unsaturated monomer material with which the single phase is formed consists at least 2 percent of conjugated diene monomer.

8. A method according to claim 6, wherein the ethylenically unsaturated monomer material with which the single phase is formed consists at least 2 percent of vinylidene monomer.

9. A method according to claim 6, wherein the ethylenically unsaturated monomer material with which the single phase is formed consists at least 98 percent of conjugated diene monomer.

10. A method according to claim 6 wherein the ethylinically unsaturated monomer materials with which the single phase is formed consists at least 98 percent of vinylidene monomer.

11. A process for forming unsaturated polymer material having a number average molecular weight in the range of from 500 to 10,000 and substantially free from polymer material of higher molecular weight range, said polymer material consisting essentially of conjugated diene polymer having substituent groups as hereinafter designated, which process comprises A. forming a single phase polymerization system consisting essentially of a combination of 1. ethylenically unsaturated monomer material having, and polymerizable with the aid of hydrogen peroxide through, at least one group and containing not more than 14 carbon atoms;

2. hydrogen peroxide, and 3. a sufficient quantity of liquid organic mutual solvent-diluent to produce a homogeneous solution of (1), (2) and (3) said quantity comprising at least 5 ml of mutual solvent-diluent per 100 grams of said monomer material;

in which combination 4. said ethylenically unsaturated monomer material consists essentially of conjugated diene;

5. the ratio of said hydrogen peroxide to said ethylenically unsaturated monomer material lies in the range of about 0.5 to about 10 parts per 100 parts of monomer, by weight; and 6. said liquid organic mutual solvent-diluent comprises at least a major proportion of lower aliphatic saturated oxygenated solvent; and B. heating said combination, essentially in the absence of oxygen or material which appreciably decomposes hydrogen peroxide to form oxygen, at a sufficient temperature in the range of above 100° C. to about 200° C. for a sufficient time to initiate and maintain polymerization to form, from said combination, polymer material containing substituent groups including hydroxyl groups derived from the solution of the said hydrogen peroxide in the said liquid organic mutual solvent, which polymer material has a number average molecular weight in the aforesaid range, and has its polymerized diene units predominantly of 1,4-configuration.

12. A process for forming unsaturated polymer material having a number average molecular weight in the range of from 500 to 10,000 and substantially free from polymer material of higher molecular weight range, said polymer material consisting essentially of butadiene polymer having substituent groups as hereinafter designated, which process comprises A. forming a single phase polymerization system consisting essentially of a combination of 1. ethylenically unsaturated monomer material having, and polymerizable with the aid of hydrogen peroxide through, at least one group and containing not more than 14 carbon atoms;

2. hydrogen peroxide, and 3. a sufficient quantity of liquid organic mutual solvent-diluent to produce a homogeneous solution of (1), (2) and (3) said quantity comprising at least 5 ml of mutual solvent-diluent per 100 grams of said monomer material;

in which combination 4. said ethylenically unsaturated monomer material consists essentially of butadiene-1,3;

5. the ratio of said hydrogen peroxide to said ethylenically unsaturated monomer material lies in the range of about 0.5 to about 10 parts per 100 parts of monomer, by weight; and 6. said liquid organic mutual solvent-diluent comprises at least a major proportion of lower aliphatic saturated oxygenated solvent; and B. heating said combination, essentially in the absence of material which appreciably decomposes hydrogen peroxide to form oxygen, at a sufficient temperature in the range of above 100° C. to about 200° C. for a sufficient time to initiate and maintain polymerization to form, from said combination, polymer material containing substituent groups including hydroxyl groups derived from the solution of the said hydrogen peroxide in the said liquid organic mutual solvent, which polymer material has a number average molecular weight in the aforesaid range, and has its polymerized diene units predominantly of 1,4-configuration.

13. A method for forming a polymer material having terminal hydroxyl groups and a number average molecular weight of not over 10,000, which method comprises forming a single phase polymerization system of a combination of
1. from 2–100 percent by weight of polymerizable ethylenically unsaturated monomer material having at least one substituent other than hydrogen and a water solubility at 20° C. of no more than 3.5 weight percent and from 0–98 percent by weight of ethylenically unsaturated monomer material having a water solubility at 20° C. greater than 3.5 weight percent, said ethylenically unsaturated monomer materials being other than conjugated diene monomers, other than drying oils and other than drying oil substances,
2. between 0.5–10 parts by weight of hydrogen peroxide per 100 parts of monomer,
3. a liquid organic solvent for all the monomer material present and said peroxide and any water present, said organic solvent having at least one group selected from the class consisting of carbinol and keto groups, said system being maintained free of components that decompose hydrogen peroxide at less than 100° C., and heating said system to temperatures in the range of from above 100° C. to about 200° C. to effect polymerization.

14. A method according to claim 13, wherein the monomer material consist essentially of vinylidene monomer.

15. A method according to claim 13, wherein said liquid organic mutual solvent comprises an alkanol.

16. A method according to claim 13, wherein said liquid organic mutual solvent comprises an alkanol containing not over four carbon atoms.

17. A method according to claim 13, wherein said liquid organic mutual solvent comprises isopropanol.

18. A method for forming a polymer material having terminal hydroxyl groups and a number average molecular weight of not over 10,000, which method comprises A. forming a single phase polymerization system consisting essentially of a combination of
1. from 2 to 100 percent by weight of polymerizable ethylenically unsaturated monomer material having at least one substituent other than hydrogen and a water solubility at 20° C. of no more than 3.5 weight percent and from 0 to 98 percent by weight of ethylenically unsaturated monomer material having a water solubility at 20° C. greater than 3.5 weight percent, said ethylenically unsaturated monomer materials consisting essentially of other than conjugated diene monomers, other than drying oils and other than drying oil substances,
2. between 0.5–10 parts by weight of hydrogen peroxide per part of monomer,
3. a liquid organic solvent for all the monomer material present and said peroxide and any water present, said organic solvent having at least one group selected from the class consisting of carbinol and keto groups, said system being maintained essentially free of components which, if present, would initiate polymerization in the system at less than 100° C., and B. heating said system to sufficiently high temperatures in the range of from above 100° C. to about 200° C. to effect polymerization.

19. A method as claimed in claim 7, wherein said ethylenically unsaturated monomer material further comprises acrylonitrile, and the polymer material formed is an unsaturated butadiene-acrylonitrile interpolymer having said terminal groups.

20. A method as claimed in claim 7, wherein said ethylenically unsaturated monomer material further comprises sytrene, and the polymer material formed is an unsaturated butadiene-styrene interpolymer having said terminal groups.

* * * * *